United States Patent

[11] 3,612,957

| [72] | Inventor | David J. Steigerwald |
| | | Greenville, S.C. |
| [21] | Appl. No. | 28,752 |
| [22] | Filed | Apr. 15, 1970 |
| [45] | Patented | Oct. 12, 1971 |
| [73] | Assignee | Union Carbide Corporation |
| | | New York, N.Y. |

[54] MOLDED CAPACITOR AND METHOD
10 Claims, 9 Drawing Figs.

[52] U.S. Cl. .................................................. 317/230,
317/242, 29/570
[51] Int. Cl. .................................................. H01g 9/00
[50] Field of Search .................................. 317/230,
231, 233; 264/272; 29/570

[56] References Cited
UNITED STATES PATENTS

| 3,396,315 | 8/1968 | Stokes ........................... | 317/230 |
| 3,516,150 | 6/1970 | Leech ............................ | 317/230 |
| 3,530,342 | 9/1970 | Klein ............................. | 317/230 |
| 3,439,231 | 4/1969 | Boae ............................. | 317/230 |

*Primary Examiner*—James D. Kallam
*Attorneys*—Paul A. Rose, Thomas I. O'Brien, Robert C. Cummings, Harrie M. Humphreys and Leo A. Plum, Jr.

ABSTRACT: Molded solid electrolytic capacitors are produced from capacitor bodies having anode lead wires spaced apart from and electrically connected to the anode riser wire by an intervening deformably arranged connecting wire.

INVENTOR
DAVID J. STEIGERWALD
BY Leo A. Plum, Jr.
ATTORNEY

INVENTOR
DAVID J. STEIGERWALD
BY Leo A. Plum, jr.
ATTORNEY

MOLDED CAPACITOR AND METHOD

This invention relates to the molding of solid electrolytic capacitors.

Solid electrolytic capacitors of the type disclosed in U.S. Pat. No. 3,166,693 are commonly provided with a protective external casing. By molding a plastic insulative material around the capacitor body, Epoxy molded solid tantalum capacitors, as an example, enjoy wide use because of their relatively low cost, self-insulating cases and suitability for automatic handling and insertion in circuit board structures, as well as for other reasons and applications. Notwithstanding these advantages however, the epoxy molded capacitor is still expected to possess all of the superior electrical characteristics of the solid electrolytic tantalum capacitor system, i.e., good capacitance, low-dissipation factor and low-leakage current. It has been found however, that quite often a capacitor which displays satisfactory electrical characteristics prior to molding will show an excessively large-leakage current when tested after molding. This results in a lower yield of satisfactory capacitors, raising the unit costs of such devices.

It is the object of this invention therefore to provide a solid electrolytic capacitor which when molded will not undergo an increase in leakage current.

It is also an object of this invention to provide a method for molding solid electrolytic capacitors without causing a degradation in the electrical characteristics of the capacitors.

It is a further object of this invention to provide molded solid electrolytic capacitors having good electrical characteristics.

Other aims and advantages of this invention will be apparent from the following description, the appended claims and the attached drawings.

SUMMARY OF THE INVENTION

In accordance with these objects an invention is provided comprising a solid electrolytic capacitor having a porous anode body formed of sintered particles of an anodizable metal; an anode riser wire of an anodizable metal extending from said body; a dielectric oxide film formed on the exposed surfaces of said particles and on at least a portion of the anode riser wire; an electrolyte layer of manganese dioxide covering the surface of the dielectric oxide film on the anode body and a portion of the anode riser wire near the anode body; a conductive coating over the manganese dioxide layer on the anode body; and a pair of axially arranged lead wires of solderable metal extending from said body comprising a cathode lead soldered to the conductive coating near one end of the body, and an anode lead adjacent to but spaced apart from the anode riser wire at the opposite end of the body and electrically connected thereto by an intervening deformably arranged connecting wire welded at one of its ends to the anode riser wire and at its other end to the adjacent end of the anode lead wire, whereby relative movement between the anode and cathode lead wires and the stress so produced will result in deformation of only the intervening deformably arranged wire thereby substantially preventing the transfer of such stress to the anode riser wire. The deformably arranged length of wire is preferably a wire of a smaller cross section than the anode lead wire and is bent into a bow or U-shape, and is arranged transversely of the anode riser wire and anode lead wire with a first welded connection near the end of one leg of the U-shaped wire to the anode riser wire, and a second welded connection near the end of the other leg of the second welded connection near the end of the other leg of the U-shaped wire to the adjacent end of the anode lead.

The so-formed capacitor can be thereafter provided with a molded case by placing the capacitor body in the mold cavity of a molding press and forcing the anode and cathode leads into the lead wire grooves extending axially from opposite ends of the mold cavity, allowing the deformably arranged length of wire connecting the anode riser wire of the capacitor to the anode lead to deform in response to any relative movement of the anode and cathode leads caused by their being forced into the wire grooves whereby the anode riser wire is left substantially unstressed, forcing fluid molding material into the mold cavity and causing the molding material to set around the capacitor body and unstressed anode riser wire. The so-molded capacitor will have axially arranged anode and cathode leads extending from the molded case and will have a substantially unstressed anode riser wire connected to the anode lead internally of the molded case by the now deformed connecting wire.

DESCRIPTION OF THE PREFERRED EMBODIMENTS

Figure 1:
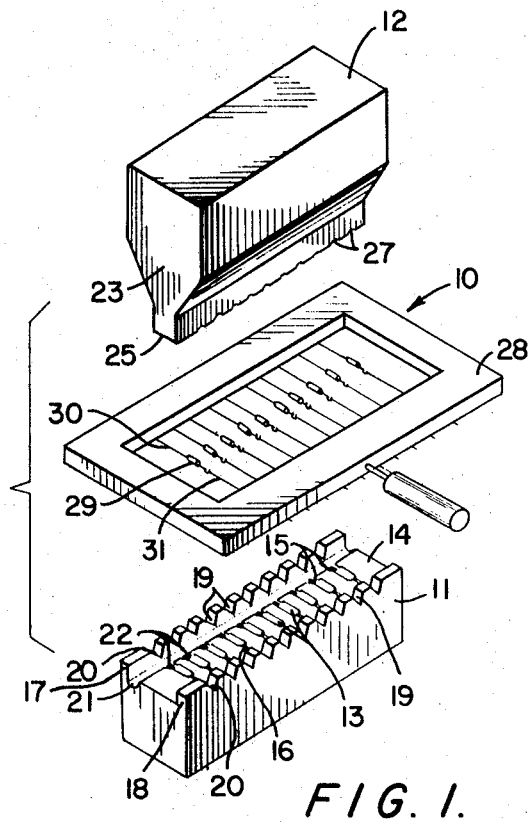
FIG. 1 is an exploded perspective view of a molding apparatus of a type used in molding the capacitors of this invention.
Figure 2:
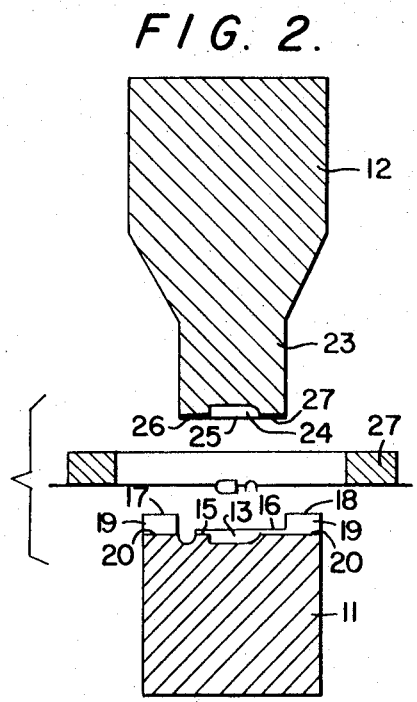
FIG. 2 is a transverse section of the molding apparatus in its open position.

Referring to FIGS. 1 and 2 there is shown a portion of transfer molding apparatus 10 suitable for molding capacitors. The mold apparatus basically comprises two sections, a bottom cavity section 11 and a top cavity section 12. The complete molding apparatus may comprise more than one set of top and bottom sections, e.g., it may have four sets of such sections arranged in two parallel rows with a central molding material supply means situated between the rows.

The bottom section 11 is seen to be rectangular and to have a plurality of spaced-apart, parallel semicylindrical mold half-cavities 13 formed in its top surface 14. Shallow grooves 15 and 16 are formed in the top surface 14 extending axially from each end of the mold cavities (as seen in FIG. 2). These grooves 15 and 16 are generally semicircular and dimensioned to receive the lower half of the lead wires connected to the capacitors to be molded so that the capacitor bodies will be suspended in the mold cavities when the lead wires are placed in the wire grooves.

Parallel sidewalls 17 and 18 rise from the top surface 14 of the bottom section 11 and each have a row of spaced-apart V-shaped notches 19. The bottoms of the notches 19 are in the form of grooves 20 each of which are in alignment with the grooves 15 and 16 in the surface 14. The notches 19 serve as lead wire guides whereby the leads of the capacitors are inserted into the parallel notches 19 and forced downwards to position the lead wires in the wire grooves 15 and 16 and place the capacitors in the mold cavities. A channel or runner 21 is formed in the surface 14 extending transversely of the row of cavities. Fluid molding material is flowed into the runner 21 and is fed into the individual mold cavities through gates 22 formed in the top surface 14, there being a gate for each mold cavity.

The top section 12 of the molding apparatus has a bottom portion 23 of a rectangular shape and dimensioned to mate inside the walls 17 and 18 of the bottom section. A row of parallel semicylindrical mold half-cavities 24 is formed in the bottom surface 25 of the section 23. These half-cavities are spaced apart in accordance with the spacing of the half-cavities 13 in the surface 14 of the bottom section 11, so that on mating of the two sections, complete mold cavities of the desired final dimensions of the molded case will be formed. Similarly, rows of wire grooves 26 and 27 are formed in the lower surface 25 of the top section 23 for mating with the wire grooves 15 and 16 in the surface 14 to hold the lead wires of the capacitors to be molded.

The capacitors are supplied to the molding apparatus mounted on a loading frame 28. A row of cylindrically shaped capacitor bodies 29 are held in the frame opening by a temporary connection of their two axially extending lead wires 30 and 31 to opposite sides of the frame. These connections are intended to be spaced apart in conformance with the spacing of the mold cavities so that when the frame member is lowered around the bottom section 11, the lead wires 30 and 31 will drop into position in the wire guides 19 placing the lead wires exactly within the wire grooves 15 and 16. However, as will be discussed hereinafter, the spacing of the capacitors on the loading frame 28 is not always as exact as desired, nor do the leads 30 and 31 always extend coaxially from the capacitor bodies, with the result that the lead wires 30 and 31 do not always fit exactly within wire guides 15 and 16.

Figure 3:
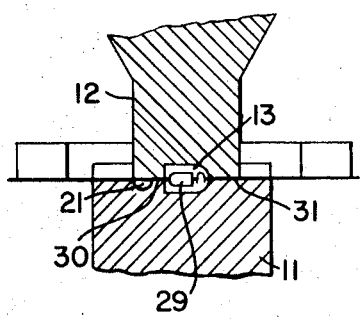
FIG. 3 is a transverse section of the molding apparatus in its closed position.

When the top and bottom sections 11 and 12 of the mold apparatus are brought together, as shown in FIG. 3, under the great pressure needed to close the mold and seal the edges of the mold cavities, the lead wires 30 and 31 of each capacitor 29 are forced into the mating wire grooves 15–26 and 16–27 at each end of the cavity 13 and thus brought into a perfectly axial relationship. The lower surface 25 of the top mold section 12 forms the roof of the runner channel 21. Fluid molding material is forced into the runner 21 and fed into each mold cavity 13 by the gates 22 (not shown in FIG. 3). Heat is supplied to the mold parts as needed to maintain the molding material fluid and/or to cause it to set, depending on the type molding material used, When the molding material has set, the mold is opened, the molded parts loosened from the cavities using knockout pins (not shown), and the frame of molded capacitors is removed.

Figure 4:
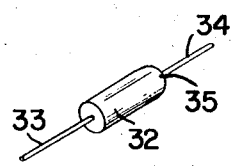
FIG. 4 is a perspective view of a molded capacitor.

FIG. 4 shows a typical molded capacitor having a molded cylindrical case 32 with lead wires 33 and 34, now cut loose from the frame, extending from each end. The molded case 32 is seen to have the familiar dome or bullet-shaped end 35 for identifying the location of the anode lead. The leads 33 and 34 of the molded capacitor are now in highly accurate axial alignment even if these leads were not properly aligned before molding. The effects of this realignment of the lead wires of the capacitor can be understood by reference to FIGS. 5, 6A, 6B, 7A and 7B.

Figure 5:
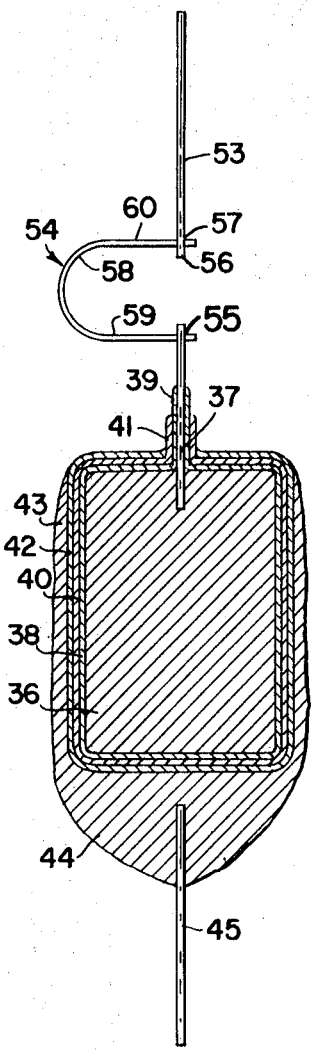
FIG. 5 is a front elevation view, in section, of a solid electrolytic capacitor in accordance with this invention.

In FIG. 5 there is shown a solid electrolytic capacitor of the type to which this invention applies. The porous capacitor body 36 is formed of pressed and sintered particles of an anodizable metal, generally tantalum. An anode riser wire 37 is shown embedded in the porous body. An oxide film 38, tantalum pentoxide, covers the exposed surfaces of the tantalum particles and acts as the capacitor dielectric. This oxide film is formed by an anodization and is seen to cover at least the portion 39 of the tantalum riser wire 37 emerging from the body 36. A layer 40 of manganese dioxide electrolyte covers the oxide film and generally extends 41 for a short distance over the oxide film 39 on the tantalum riser wire 37. This manganese dioxide electrolyte layer can be produced by pyrolysis of an aqueous solution of manganous nitrate solution applied over the oxide film.

A conductive coating 42 covers the manganese dioxide layer on the capacitor body. This conductive coating generally comprises a composite coating of, for example, an underlying graphite coating covered by a metallic paint or thin solderable metal coating. A solder coating 43 is applied over the conductive coating to make electrical contact to the counterelectrode system of the capacitor, namely, the conductive coating 42 and underlying manganese dioxide electrolyte. The solder coating 43 is formed as a larger body of solder 44 at the base of the capacitor body by which a cathode lead wire 45, only a portion of which is shown, is soldered to the body. This lead 45 is generally of a solderable metal, e.g. nickel.

The tantalum riser wire 37 at the opposite end of the body must also have a solderable metal wire connected thereto since tantalum itself is not directly solderable. Generally a length of nickel wire is welded to the end of the tantalum riser to provide this solderable anode lead for connection into circuit structures by soldering.

Figure 6A:
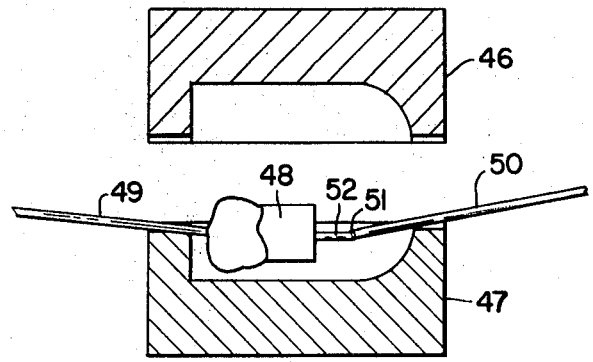
FIGS. 6A and 6B are schematic sectional views of the mold parts in open and closed position showing the deformation of the anode wire stub of a conventional capacitor caused by closing the mold parts.
Figure 6B:
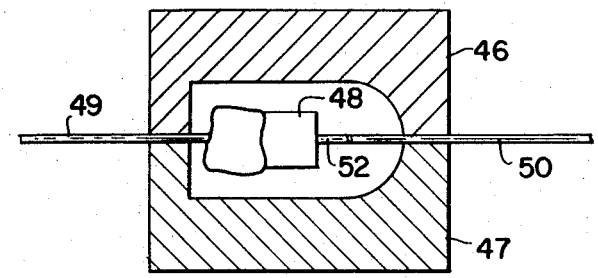

Referring to FIGS. 6A and 6B, there is depicted the top 46 and bottom 47 cavity sections of a mold wherein a capacitor 48 having soldered-on cathode lead 49 and an anode lead 50 directly welded at 51 to the tantalum riser wire 52 emerging from the capacitor body 48. As depicted in FIG. 6A there is a considerable degree of misalignment between the leads 49 and 50, which should desirably be coaxially arranged. While the degree of misalignment is exaggerated here for the purpose of illustration, it is commonplace that some degree of misalignment will generally be found in commercially prepared parts. The leads 49 and 50 are connected in largely manual operations involving only semiautomatic wire feeds. The irregularities of the capacitor itself, due to the nonuniformity of the various coatings, does not generally permit the precise fixturing of the part when these leads are attached. As a result the lead wires are often less than perfectly aligned. Additionally, the connection of the leaded capacitors to the loading frames is a largely manual operation, and proper spacing and parallelism is not always achieved.

The overall result is that an imprecisely assembled loading frame of imprecisely aligned capacitors is placed in a highly precise mold. There is no allowance in the mold for any error in the alignment of the parts to be molded. The wire grooves in the mold surfaces must fit closely around the leads on the capacitor so as to prevent the fluid molding material from escape through the lead wire holes.

As a result, when the mold closes, the action is the same as if the lead wires were clamped in a vise. If not perfectly prealigned, they are immediately deformed, as shown in FIG. 6B, into an exact axial alignment. The stresses produced in the nickel wires is transmitted to the capacitor body 48 and, in particular, to the tantalum riser wire 52 and the anodic tantalum pentoxide film which is present on this wire. Of course, if the stress on the tantalum riser wire is so severe as to completely rupture the oxide film so as to allow conductive particles from the electrolyte or from the conductive coatings to physically contact the underlying tantalum, then the capacitor will fail by a complete voltage breakdown.

It has been observed however, that a lesser degree of stress on the tantalum riser than is necessary to cause complete voltage breakdown can still cause a degradation of the electrical characteristics of the capacitor, namely, an increase in the leakage current; and additionally, that this condition is reversible, i.e. when the stress is removed the leakage current is decreased to its normal value. While this phenomena is not completely understood, and the invention here is not to be considered limited to the mechanism set out here, the following explanation of the operation of this invention is thought to apply. It is believed that when the leads of the capacitor are forced into alignment in the wire grooves, the resulting deformation of the tantalum riser causes a stress on the tantalum pentoxide film on the riser resulting in an increased leakage current. It has been observed that if the capacitor is immediately removed from the cavity before molding, the leakage current will decrease to its original value, apparently due to the removal of the stress on the tantalum riser wire. By "original value of the leakage current" is meant the leakage current of the capacitor prior to being forced into the mold. If, however, the capacitor is left in the mold with its tantalum riser in a stressed condition and the molding material admitted into the cavity and caused to harden, the tantalum riser and its oxide film will be frozen in the stressed condition and the so-molded capacitor will exhibit an undesirably high-leakage current.

It is the purpose of this invention therefore to prevent the occurrence of such a stressed condition in the tantalum riser and its oxide film during molding, whereby the tantalum riser and its oxide film will be unstressed in the molded part and the capacitor will exhibit its normal or original leakage current. Referring again to FIG. 5, it is seen that the solderable metal anode lead wire 53 is not welded directly to the tantalum riser 37 as is conventional for capacitors to be molded. Instead a short length of wire 54 is deformably arranged between these wires and connected at one end to the tantalum riser by weld 55 and connected at its opposite end to the adjacent end 56 of the anode lead by a weld 57. As shown the wire 54 is deformably arranged by being bent into a U-shaped form having a flexible bow section 58 joined to parallel legs 59 and 60. The welded connections 55 and 57 are made at or near the ends of these legs 59 and 60. The wire 54 could be provided with other shapes to give it the deforming characteristics required. It is preferred that this wire 54 be weaker, i.e. of a lesser cross section than the anode lead wire 53, whereby the relative movement of the leads 53 and 45 can be absorbed completely in deforming the connecting wire 54 without leaving any residual stresses in the tantalum riser 37. For example, if the anode lead 53 is a 0.032 inch diameter nickel wire, then the connecting wire 54 can be a 0.015 inch diameter nickel wire, i.e. about one-half the diameter of the anode lead wire. The connecting wire 54 should not be of such a small cross section, however, as to increase the impedance of the electrical path from the tantalum riser to the anode lead wire. The term "deformably arranged connecting wire" as used herein therefore means any combination of shaping and reduced cross section as will allow deformation of the connecting wire without leaving residual stresses in the tantalum riser and without increasing the impedance of the connected path between the tantalum riser and the anode lead wire.

Figure 7A:
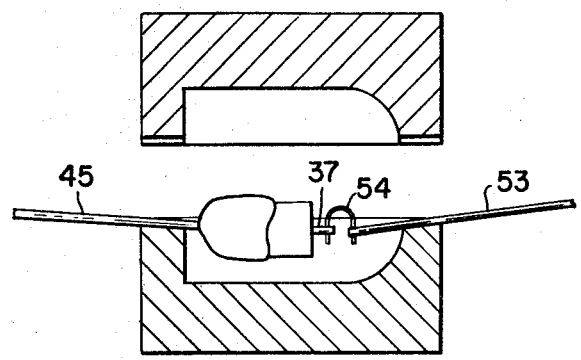
FIG. 7A and 7B are schematic sectional views of the mold parts in open and closed position showing the result of the closing of the mold parts around a capacitor made according to this invention whereby no deformation of the anode wire stub occurs.
Figure 7B:
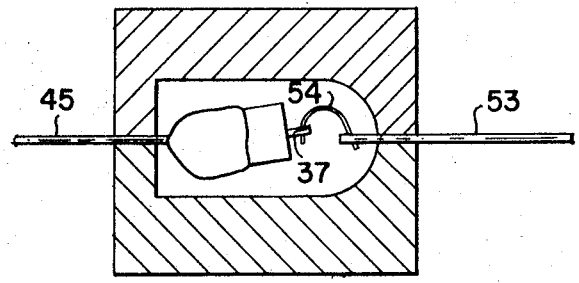

The operation of the capacitor of this invention can now be understood by reference to FIGS. 74 and 7B. In FIG. 7A, it is seen that the lead wires 45 and 53 of the capacitor, as in FIG. 6A, are again not perfectly aligned. In this case however, the anode lead 53 is not directly welded to the tantalum riser 37, but is electrically connected thereto by the intervening deformably arranged connecting wire 54, which is welded at either end to the tantalum riser 37 and to the anode lead wire 53. Referring to FIG 7B, when the mold is closed, the lead wires 45 and 53 are brought into exact axial alignment. The relative movement of the wires 45 and 53, and the stress this strain would normally produce, is seen to have been absorbed in deforming the connecting wire 54, as can be seen by the distortion of the wire 54 and the offset between the ends of the tantalum riser and anode lead wire. As a result, the tantalum riser 37 and its oxide film is left unstressed. When the molding material is admitted into the cavity, it will freeze the capacitor and the wires 45, 37, 54 and 53 in the positions shown. Additionally, because of the deformability of the connecting wire 54, any forces exerted on the capacitor body by the pressure of the molding material will only further deform the wire 54 and will not cause a buildup of stresses in the tantalum riser. The molded unit will contain a capacitor whose tantalum riser is unstressed and will therefore exhibit a normal leakage current. It has been found that the molding of capacitors according to this invention gives a significantly higher yield of satisfactory units than is obtained when conventional capacitors are molded.

It is to be noted that the deformably arranged connecting wire 54 will not function as a stress reliever in the finished molded part, as might a stress reliever found in a canned capacitor where thermal conditions cause unequal expansions of the can and the capacitor leads. In the molded capacitor of this invention, the deformed connecting wire will be frozen into a rigid position by the surrounding molding material and it will not thereafter function to further deform or to relieve stress on the tantalum capacitor. However, that is not its function since the stress conditions to be presented occur only in the molding of the capacitor.

Additionally it is to be noted that the deformably arranged connecting wire 54 is not intended to serve as an anchor for the anode lead 53 to increase the "pullout" strength of this lead in the molded case. While anode leads are commonly given bends, twists, loops, etc., to more firmly anchor the leads in the molded case, such is not the intention or the main effect here. In those cases where the leads of various types of capacitors are bent before molding to increase the "pullout" strength of the connection, the deformation of the leads during molding can still result in a stressed condition in the capacitor because the leads would still be physically joined to the capacitor body and would not necessarily be deformable.

Additionally the bending, twisting or looping of lead wires for anchoring purposes can result in a work hardening of the bent portion. This work hardened condition raises the electrical resistance of the path from the riser wire to the outside connection of the capacitor in a circuit structure and is undesirable. In the present invention however, the anode lead wire is not physically connected to the tantalum riser. The connecting wire moreover is purposely of a cross section and shape so as to allow its easy deformation. If it is desired to increase the "pullout" strength of the anode wire connection in the molded case, then the end 56 of this anode lead 53 can be bent transversely as desired to anchor it in the molding material. Moreover, the connecting wire should be in a soft nonwork hardened condition whereby the electrical resistivity of the path between the tantalum riser wire and the external connection of the capacitor into a circuit structure is not increased.

What is claimed is:

1. A solid electrolytic capacitor suitable for molding in a mold cavity to form an insulative case therearound comprising a porous anode body formed of sintered particles of an anodizable metal; an anode riser wire of an anodizable metal extending from said body; a dielectric oxide film formed on the exposed surfaces of said particles and on at least a portion of the anode riser wire; an electrolyte layer of manganese dioxide covering the surface of the dielectric oxide film on the anode body and a portion of the anode riser wire near the anode body; a conductive coating over the manganese dioxide layer on the anode body; and a pair of lead wires of solderable metal extending from said body comprising a cathode lead soldered to the conductive coating on the body, and an anode lead spaced apart from and electrically connected to the anode riser wire by an intervening, deformably arranged connecting wire welded at one of its ends to the anode riser wire and at its other end to the adjacent end of the anode lead wire.

2. The capacitor of claim 1 in which the deformably arranged connecting wire is a U-shaped wire of smaller cross section than the anode lead wire and is arranged transversely of the anode riser wire and anode lead wire with a first welded connection near the end of one leg of the U-shaped wire to the anode riser wire, and a second welded connection near the end of the other leg of the U-shaped wire to the adjacent end of the anode lead wire.

3. A solid electrolytic capacitor suitable for molding in a mold cavity to form an insulative case therearound comprising a porous tantalum anode body formed of sintered tantalum particles; a tantalum anode riser wire extending from said body; a dielectric oxide film formed on the exposed surfaces of the tantalum body and on at least a portion of the tantalum riser wire; an electrolyte layer of manganese dioxide covering the dielectric oxide film on the tantalum body and on a portion of a tantalum riser wire near the anode body; a conductive coating over the manganese dioxide layer on the anode body; and a pair of axially arranged nickel lead wires extending from the capacitor body comprising a cathode lead wire soldered to the conductive coating at one end of the body; and an anode lead adjacent to but spaced apart from the tantalum riser wire at the opposite end of the body and electrically connected thereto by an intervening deformably arranged connecting wire welded at one of its ends to the tantalum riser wire and at its other end to the adjacent end of the anode lead.

4. The capacitor of claim 3 in which the deformably arranged connecting wire is a U-shaped nickel wire of smaller cross section than the anode lead wire, and is arranged transversely of the tantalum riser wire and anode lead wire with a first welded connection near the end of one leg of the U- shaped wire and a second welded connection near the end of the other leg of the U-shaped wire to the adjacent end of the anode lead wire.

5. The capacitor of claim 4 in which the diameter of the deformably arranged connecting wire is about one half that of the anode lead wire.

6. The capacitor of claim 4 in which the deformably arranged connecting wire is in a nonwork hardened condition.

7. The method of molding an insulative case around a tantalum solid electrolytic capacitor comprising:
   a. providing a porous tantalum anode body having a tantalum riser wire extending therefrom and a dielectric oxide film thereon, a solid electrolyte layer over the oxide and a conductive coating over the electrolyte layer with a cathode lead soldered to the conductive coating at one end of the body and a anode lead wire adjacent to but spaced away from the tantalum riser at the opposite end of the body and electrically connected thereto by an intervening deformably arranged connecting wire welded at one of its ends to the tantalum riser wire and at the other of its ends to the adjacent end of the anode lead wire,
   b. placing the body in the mold cavity formed by mating mold parts each having half cavities formed therein with lead wire grooves extending axially from each end of the cavities and closing the mold parts around the body to seal it in the cavity and to form the anode and cathode leads into the wire grooves,
   c. allowing the deformably arranged connecting wire to deform in response to relative movement of the anode and cathode lead wires caused by their being forced into the wire grooves whereby the tantalum riser wire and its oxide film is left unstressed in the mold cavity,
   d. admitting fluid molding material into the mold cavity and causing it to set around the body therein and unstressed tantalum riser wire and thereafter removing the molded capacitor from the mold.

8. A molded solid electrolytic capacitor having a leakage current equivalent to its leakage current before having been molded comprising internally of said molded case a porous tantalum anode body having an unstressed tantalum riser wire extending therefrom, a dielectric oxide film over the body and at least a portion of the riser wire a solid electrolyte layer over the oxide film on the body and a portion of the riser wire, and a conductive coating over the electrolyte layer on said body, a cathode lead wire extending into the molded case and having its end therein soldered to the conductive coating at one end of the body, an anode lead wire, extending into the molded case and having its end therein adjacent to but spaced apart from the tantalum riser wire and electrically connected thereto by a deformed connecting wire welded at one of its ends to the tantalum riser wire and welded at the other of its ends to the adjacent end of the anode lead wire.

9. The molded capacitor of claim 8 in which the anode and cathode lead wires are of nickel and in which the deformed connecting wire is of nickel.

10. The molded capacitor of claim 9 in which the diameter of the deformed connecting wire is about one-half the diameter of the anode lead wire.